US009527585B2

(12) United States Patent
Roberts

(10) Patent No.: US 9,527,585 B2
(45) Date of Patent: Dec. 27, 2016

(54) AIRCRAFT GROUND STEERING SYSTEM

(71) Applicant: Bell Helicopter Textron Inc., Forth Worth, TX (US)

(72) Inventor: Brad J. Roberts, Fort Worth, TX (US)

(73) Assignee: Bell Helicopter Textron Inc., Fort Worth, TX (US)

(*) Notice: Subject to any disclaimer, the term of this patent is extended or adjusted under 35 U.S.C. 154(b) by 494 days.

(21) Appl. No.: 14/567,347

(22) Filed: Dec. 11, 2014

(65) Prior Publication Data
US 2016/0272306 A1 Sep. 22, 2016

(51) Int. Cl.
G05D 1/00 (2006.01)
B64C 25/50 (2006.01)
G05D 1/02 (2006.01)

(52) U.S. Cl.
CPC ............. *B64C 25/50* (2013.01); *G05D 1/0202* (2013.01)

(58) Field of Classification Search
USPC .......................................................... 701/4
See application file for complete search history.

(56) References Cited

U.S. PATENT DOCUMENTS

| | | | | |
|---|---|---|---|---|
| 6,059,380 A | * | 5/2000 | Pueschel | B60T 8/175 303/113.2 |
| 2009/0314256 A1 | * | 12/2009 | Bland | F02C 3/305 123/456 |
| 2010/0213757 A1 | * | 8/2010 | Wagner | B60T 8/34 303/10 |
| 2011/0233328 A1 | * | 9/2011 | Alleau | B64C 25/24 244/102 R |
| 2012/0145823 A1 | * | 6/2012 | Westerlund | B64F 1/002 244/50 |
| 2015/0175257 A1 | * | 6/2015 | Gorce | B64C 25/405 701/3 |

OTHER PUBLICATIONS

Wikimedia Foundation, Inc., Steering, Wikipedia.org, http://en.wikipedia.org/wiki/Steering, p. 4. (last visited Dec. 11, 2014).

* cited by examiner

*Primary Examiner* — Hussein A. Elchanti
(74) *Attorney, Agent, or Firm* — Alison A. Woodruff

(57) ABSTRACT

In some embodiments, the steering of an aircraft is enhanced by the use of a steering control system. The steering control system may include a steering request unit, a speed measurement unit, a steering control unit, and a steering control device. The steering control system is operable to generate and transmit to a steering control device, a wheel position request based on a steering request and the speed of the aircraft.

15 Claims, 5 Drawing Sheets

AIRCRAFT GROUND STEERING SYSTEM

TECHNICAL FIELD

This invention relates generally to an aircraft, and more particularly, to an aircraft enhanced steering system.

BACKGROUND

An aircraft is a machine that is able to fly by gaining support from the air. It counters the force of gravity by using either static lift or by using the dynamic lift of an airfoil. There are different types of aircraft such as fixed-wing aircraft and rotorcraft.

An aircraft my include landing gear that supports the aircraft when it is not flying. The landing gear may allow the aircraft to take off, land, and taxi without damage. Different types of landing gear may be used; these include, but are not limited to, wheels, skids, skis, floats, or a combination of these.

SUMMARY

Particular embodiments of the present disclosure may provide one or more technical advantages. A technical advantage of one embodiment may include the capability to use the same pilot primary and natural directional controls to steer an aircraft on the ground at both high speeds and low speeds. A technical advantage of one embodiment may include an increased stability of an aircraft on the ground at high speeds. A technical advantage of one embodiment may be an increased maneuverability of an aircraft on the ground at low speeds.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
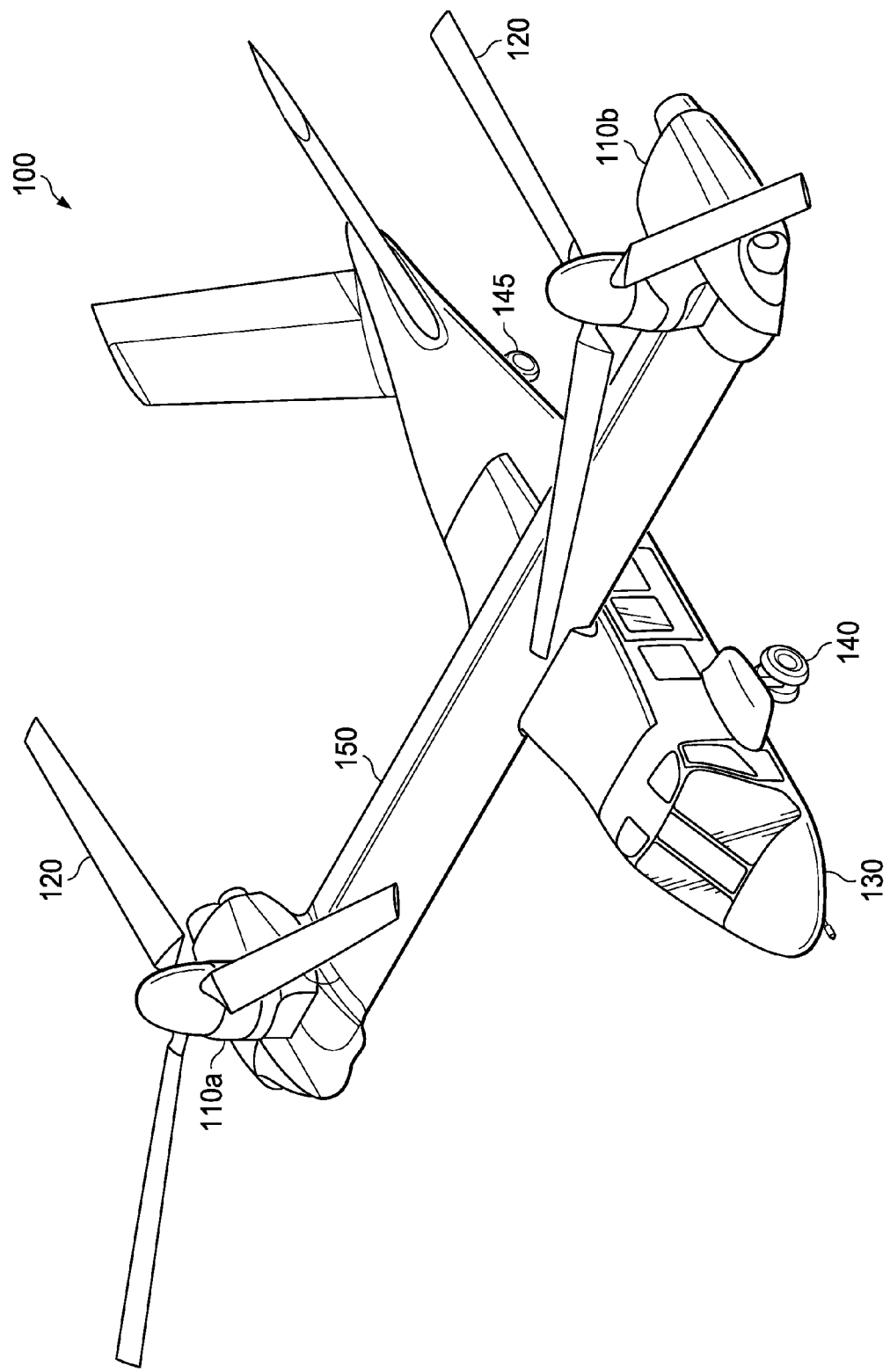
FIG. 1 shows a rotorcraft according to one example embodiment.

FIG. 1 shows an aircraft 100 according to one example embodiment. Aircraft 100 may represent a rotorcraft that features rotor systems 110a and 110b, blades 120, a fuselage 130, a landing gear 140, a steerable wheel 145, and a wing 150.

Rotor system 110 may rotate blades 120. Rotor system 110 may include a control system for selectively controlling the pitch of each blade 120 in order to selectively control direction, thrust, and lift of aircraft 100. In the example of FIG. 1, aircraft 100 represents a tilt rotor aircraft, and rotor systems 110a and 110b feature rotatable nacelles. In this example, the position of nacelles 110a and 110b, as well as the pitch of rotor blades 120, can be selectively controlled in order to selectively control direction, thrust, and lift of aircraft 100.

Fuselage 130 represents the main body of aircraft 100 and may be coupled to rotor system 110 (e.g., via wing 150) such that rotor system 110 and blades 120 may move fuselage 130 through the air. Landing gear 140 supports aircraft 100 when aircraft 100 is landing and/or when aircraft 100 is at rest on the ground. Landing gear 140 may include a steerable wheel 145. Once aircraft 100 has landed, steerable wheel 145 may be steered to allow the aircraft to turn. It should be appreciated that steerable wheel 145 may be associated with the tail landing gear (as shown in FIG. 1) and/or the nose landing gear (as shown in FIG. 2).

In the example of FIG. 1, aircraft 100 may operate in a helicopter mode by tilting the nacelles upright and in an airplane mode by tilting the nacelles forward. Aircraft 100 may generate greater forward speed in airplane mode than in helicopter mode because, in airplane mode, blades 120 are oriented to generate greater thrust propelling the aircraft forward (somewhat analogous to a propeller).

Figure 2:
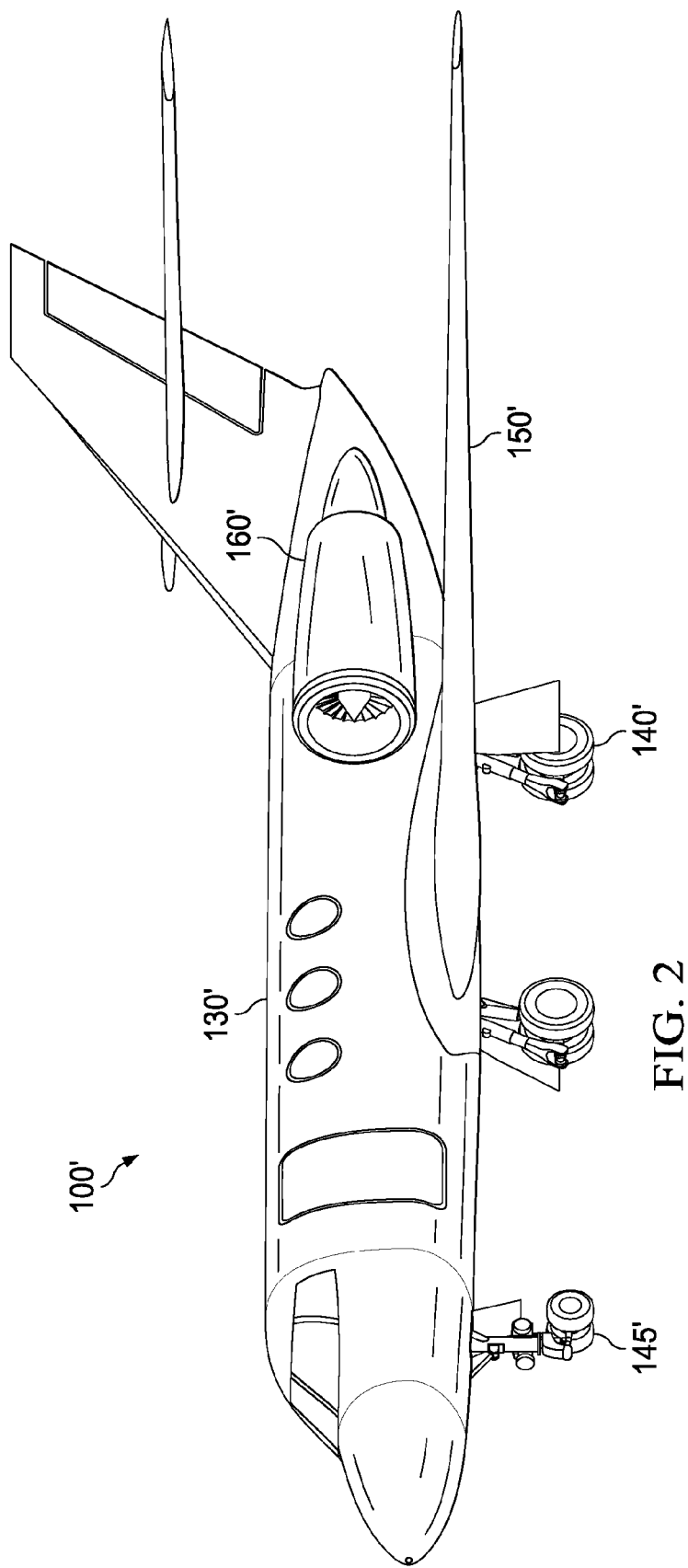
FIG. 2 shows an airplane according to one example embodiment.

Now referring to FIG. 2, aircraft 100' represents a fixed-wing airplane. Aircraft 100' may represent a fixed-wing airplane that features a fuselage 130', a landing gear 140', a steerable wheel 145', a wing 150', and an engine 160'. One or more engine 160' may propel aircraft 100' through the air by generating forward thrust.

Teachings of certain embodiments relating to rotor systems described herein may apply to rotor system 110 and/or other rotor systems, such as non-tilting rotor and helicopter rotor systems. It should also be appreciated that teachings from aircraft 100 may apply to aircraft other than rotorcraft, such as fixed-wing airplanes, such as aircraft 100', and unmanned aircraft, to name a few examples.

Teachings of certain embodiments recognize the capability to improve operation of a steerable wheel, such as steerable wheel 145. As one example, if a rotorcraft is landing at a high-density altitude or with a high gross weight condition, it may be necessary to compensate with a shallow approach and a running landing. Similarly to a fixed-wing aircraft, such as aircraft 100', it may be preferable, on a running landing, to limit the maximum angle of the steerable wheel 145 and decrease the sensitivity of the steerable wheel 145 relative to the pilot's inputs. This may help the aircraft land in a straight line. However, as the aircraft slows down, it may be preferable to increase the maximum angle and increase the sensitivity of the steerable wheel 145 relative to the pilot's inputs. Therefore, a suitable device to optimize the steering of an aircraft, such as aircraft 100 or 100', is needed.

Figure 3:
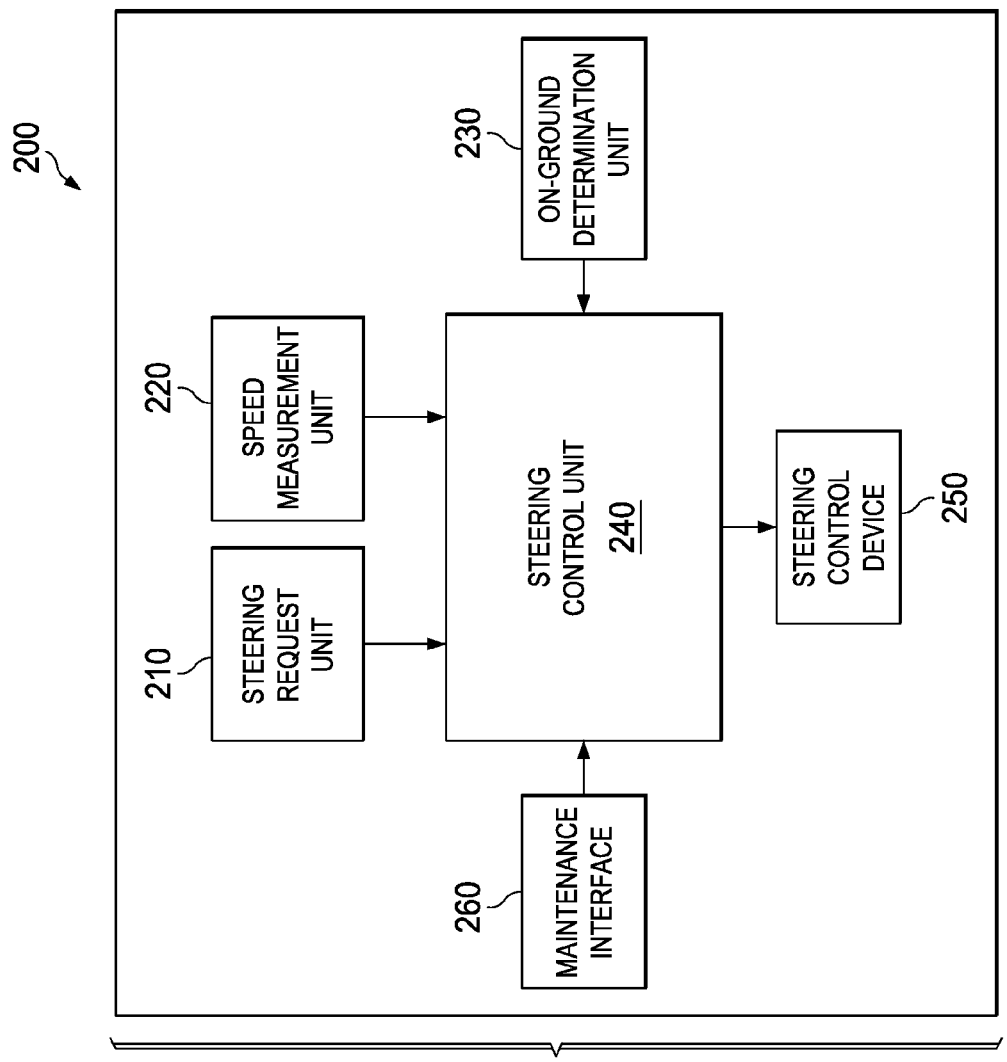
FIG. 3 shows a schematic of an enhanced steering system according to one example embodiment.
Figure 3:
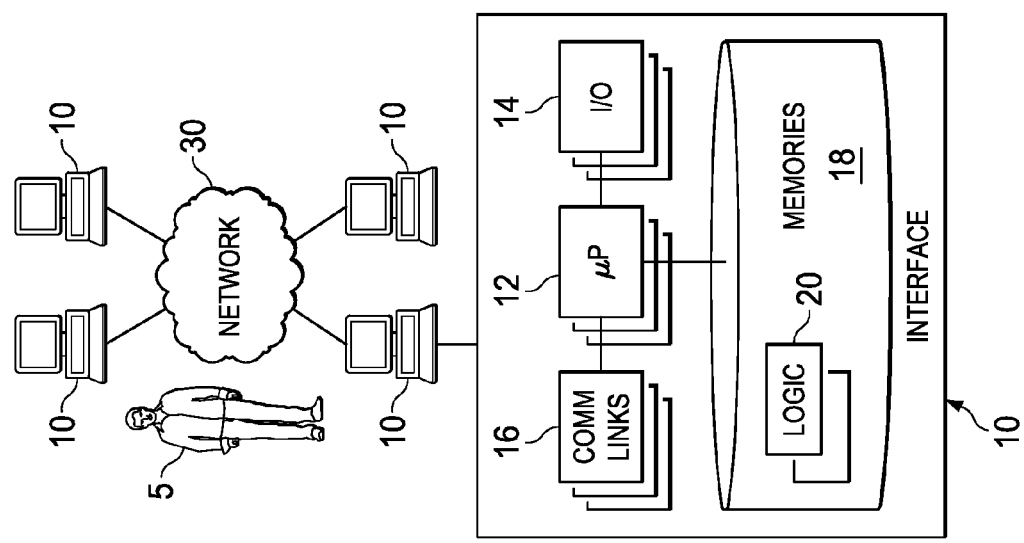

FIG. 3 shows an example embodiment of a steering control system 200 that may be used to automatically adjust the sensitivity of the steering of an aircraft such as aircraft 100 or 100'. Steering control system 200 may include a steering request unit 210, a speed measurement unit 220, an on-ground determination unit 230, a steering control unit 240, a steering control device 250, and a maintenance interface 260. Steering control system 200 may be implemented at least partially by one or more computer systems 10. All, some, or none of the components of steering control system 200 may be located on or near an aircraft such as aircraft 100 or 100'.

Users 5 may access steering control system 200 through computer systems 10. For example, in some embodiments, users 5 may access elements of steering control system 200, such as steering control unit 240, which may be at least partially associated with a computer system 10. Users 5 may include any individual, group of individuals, entity, machine, and/or mechanism that interacts with computer systems 10. Examples of users 5 include, but are not limited to, a pilot, service person, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Steering control system 200 may include a steering request unit 210. Steering request unit 210 may represent any suitable device for inputting a steering request. For example, steering unit 210 may include pilot primary and natural directional controls, such as pedals or a control stick, that the pilot may use to input a steering request of steerable wheel 145. As another example, steering unit 210 may represent a tiller wheel that the pilot may use to instruct a steering request of steerable wheel 145. In another example embodiment, aircraft 100 or 100' is an unmanned aerial vehicle (UAV), and a computer is used to instruct a steering request of steerable wheel 145.

Steering control system 200 may also include a speed measurement unit 220. Speed measurement unit 220 may represent any suitable device for measuring and outputting the airspeed and/or groundspeed of an aircraft such as aircraft 100 or 100'. Groundspeed is the horizontal speed of an aircraft relative to the ground. Airspeed is the speed of an aircraft relative to the air. Many devices that are used to measure airspeed are not accurate below 40 knots; therefore, there are benefits to using a device that measures ground speed for speed measurement unit 220.

Ground speed may be measured by a global positioning system (GPS). A GPS system is a navigational system using satellite signals to determine the location, time, and velocity (speed and direction) on or above the earth's surface. In another example embodiment, speed measurement unit 220 is a differential global positioning system (DGPS). A DGPS is an enhancement to GPS that provides an improved accuracy by using a network of fixed, ground-based reference stations to broadcast the difference between the positions indicated by the satellite systems and the known fixed positions. As another example, ground speed may be measured by a wheel speed sensor to measure the rotational speed of steerable wheel 145.

Steering control system 200 may also include an on-ground determination unit 230. On-ground determination unit 230 may be any suitable device capable of detecting whether an aircraft, such as aircraft 100 or 100', is on the ground (e.g. during taxiing, take-off, or landing). For example, on-ground determination unit 230 may include a sensor to measure the weight on the wheels. If the weight on the wheels exceeds a threshold value, the aircraft is on the ground; if not, the aircraft is in the air. In another example embodiment, on-ground determination unit 230 includes a sensor that detects landing gear position. If the landing gear is down, the aircraft is on the ground. In yet another example embodiment, on-ground determination unit 230 may sense the position of the switch in the cockpit that controls the position of landing gear 140.

Steering control system 200 may also include a steering control unit 240. Steering control unit 240 may represent any device capable of receiving information from one or more of: steering request unit 210, speed measurement unit 220, and on-ground determination unit 230. Steering control unit 240 may also represent any device also capable of outputting an instruction to steering control device 250.

In one example embodiment, steering control unit 240 receives the steering request, the ground speed, and whether aircraft 100 or 100' is on the ground. In this example, if it is determined that aircraft 100 or 100' is on the ground, then steering control unit 240 may use the ground speed and the steering request to determine from a steering profile, a wheel position request. The steering profile may be one or more formulas and/or look-up tables that affect the wheel position request. The wheel position request may be the angle at which steerable wheel 145 turns, after steering control unit 240 accounts for variables in the steering profile.

In some embodiments, the steering profile comprises of two variables that change relative to the speed of aircraft 100 or 100'. The first variable may be the maximum angle. The maximum angle may be used to limit the amount that steerable wheel 145 turns, relative to a straight ahead position, as a function of speed. For example, if the maximum angle is ten degrees for a specific speed, the wheel position request may be limited between negative ten degrees to a positive ten degrees, where the zero degree position is directly in front of the aircraft.

The second variable may be the steering sensitivity. The steering sensitivity is the amount that steerable wheel 145 turns relative to the amount of input received from steering request unit 210, as a function of speed. For example, at high speeds, the wheel position request output by steering control unit 240 may turn steerable wheel 145 a small amount relative to the input received by the pedals; at low speeds, the steerable wheel 145 may turn a larger amount relative to the input received by the pedals.

The two variables, maximum angle and steering sensitivity, together may establish the steering profile. For example, when an aircraft, such as aircraft 100 or 100', is travelling at high speeds, it may be preferable to reduce both the maximum angle and the steering sensitivity. Therefore, in one example scenario, the steering profile may be so that when aircraft 100 or 100' is travelling at 120 knots, the steering sensitivity is set so that steerable wheel 145 turns by only two degrees for each inch that the pilot pushes down on one of the pedals. Additionally, the maximum angle may be set to a maximum of ten degrees.

Conversely, when aircraft 100 or 100' is travelling at low speeds, it may be preferable to increase both the maximum angle and the steering sensitivity. Therefore, in one example scenario, the steering profile may be so that when aircraft 100 or 100' is travelling at 15 knots, the steering sensitivity is set so that steerable wheel 145 turns by ten degrees for each inch that the pilot pushes down on one of the pedals. Additionally, the maximum angle may be set to a maximum of ninety degrees.

Figure 4:
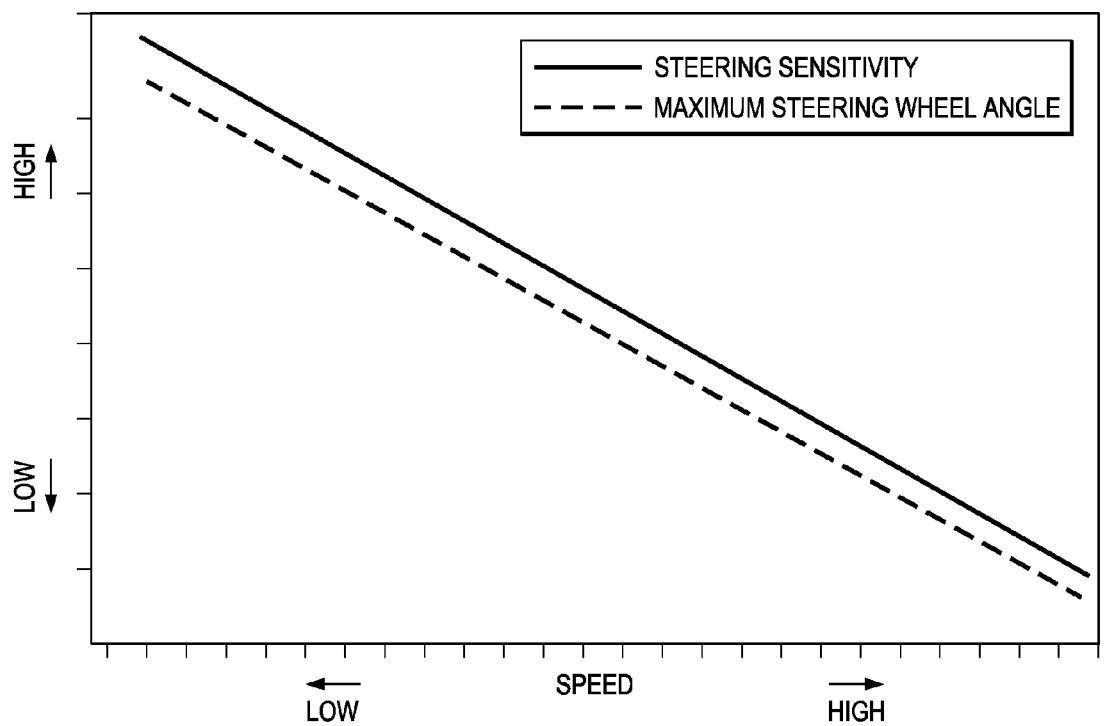
FIG. 4 shows a relational chart according to one example embodiment.
Figure 5:
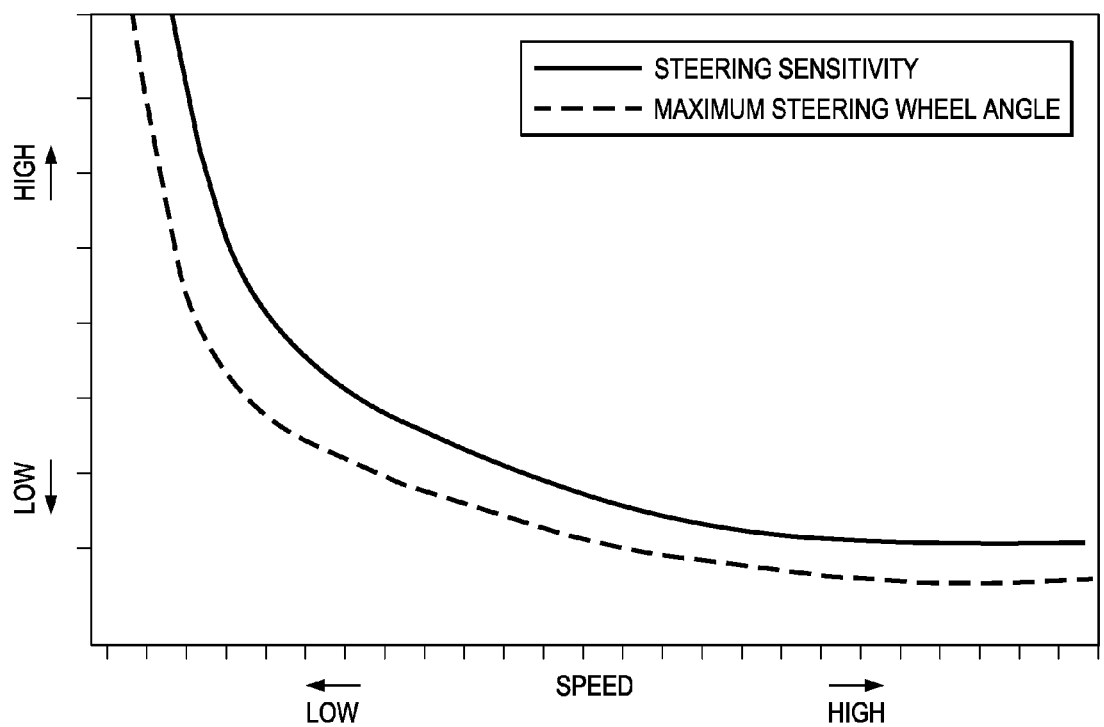
FIG. 5 shows a relational chart according to one example embodiment.
Figure 6:
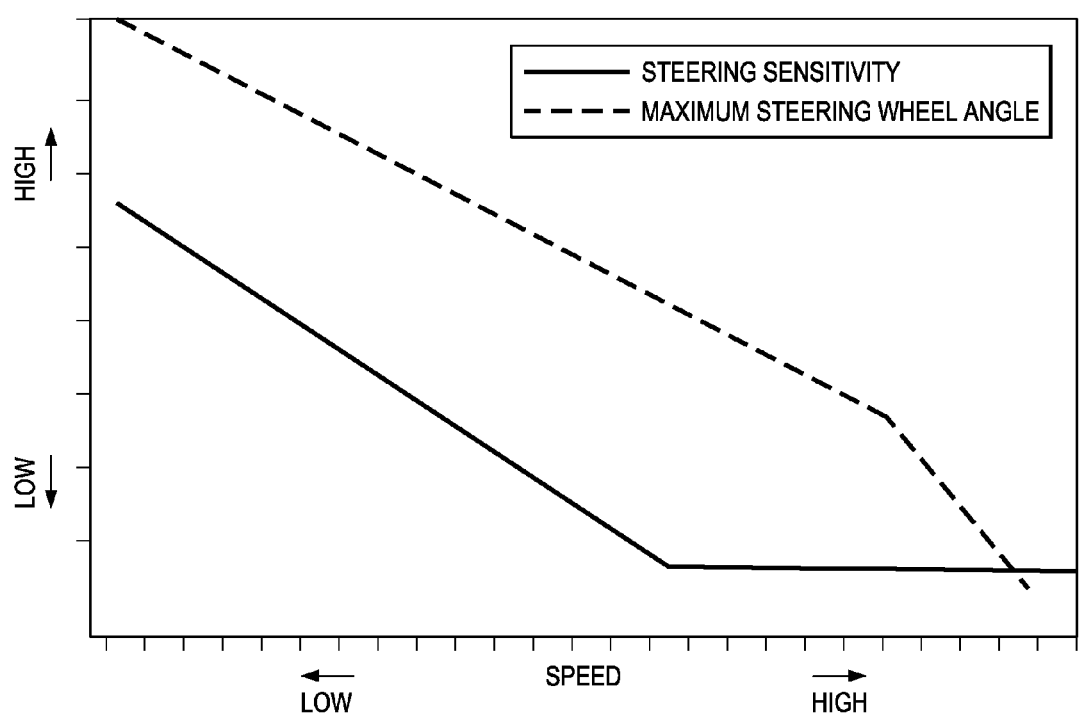
FIG. 6 shows a relational chart according to one example embodiment.

Other example embodiments have a variety of different steering profiles based on preferences or aircraft types. FIGS. 4-6 show examples of different steering profiles. FIG. 4 shows a steering profile where both the maximum angle and steering sensitivity reduces linearly as the speed of aircraft 100 or 100' increases.

In another example embodiment, it is preferable to have a steering profile where the maximum angle and/or steering sensitivity decreases non-linearly as the speed of aircraft 100 or 100' increases. It should be noted that there may be a myriad of steering profiles that may be chosen to optimize the steering of an aircraft, such as aircraft 100 and 100'.

Steering control unit 240 may determine a maximum angle and/or a steering sensitivity by using a look-up table of values. In another example embodiment, steering control unit 240 may use a formula to determine a maximum angle and/or a steering sensitivity.

Once steering control unit 240 determines a maximum angle and/or steering sensitivity, steering control unit 240 may output a wheel position request to steering control device 250. Steering control device 250 may represent any device that has the capability to turn steerable wheel 145. For example, steering control device 250 may include actuators that are hydraulically powered and may rotate steerable wheel 145. As another example, steering control device 250 may include an electric steering control system where steerable wheel 145 is turned by an electric motor.

Steering control system 200 may also include maintenance interface 260. Maintenance interface 260 may represent any device operable to update or revise data. Maintenance interface 260 may be used to update the data within steering control system 200. In some embodiments, the maintenance interface 260 may be configured to allow for reviewing or revising the data stored in steering control unit 240. This may include, for example, updating database management software, revising security settings, or performing data backup operations.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. An aircraft, comprising:
  a body;
  a landing gear coupled to the body and comprising a steerable wheel; and
  a steering control system comprising:
  a steering request unit configured to receive a steering request;
  a speed measurement unit configured to determine a speed of the aircraft; and
  a steering control unit configured to:
  generate a wheel position request based on the received steering request and the determined speed of the aircraft; and
  transmit the wheel position request to a steering control device, the steering control device configured to turn the steerable wheel based on the generated wheel position request;
  wherein the steering control unit generates the wheel position request by limiting the wheel position request to a maximum angle based on the determined speed of the aircraft.

2. The aircraft of claim 1, wherein the speed is a ground speed representing a horizontal speed of the aircraft relative to the ground.

3. The aircraft of claim 1, wherein the speed measurement unit is a Global Positioning System (GPS).

4. The aircraft of claim 1, wherein the steering control unit generates the wheel position request by limiting the wheel position request based on a steering sensitivity ratio, wherein the steering sensitivity ratio is a ratio between the steering request and the wheel position request, wherein the steering sensitivity ratio changes as a function of speed.

5. The aircraft of claim 1, wherein the steering control system further comprises an on-ground determination unit configured to determine whether the aircraft is on the ground.

6. The aircraft of claim 5, wherein the steering control unit is further operable to:
  generate the wheel position request based on the received steering request, whether the aircraft is on the ground, and the determined speed of the aircraft; and
  transmit the wheel position request to a steering control device, the steering control device operable to turn the steerable wheel based on the generated wheel position request.

7. The aircraft of claim 1, wherein the steering control unit is further operable to:
  retrieve a steering profile that relates a maximum angle to aircraft speed; and
  generate the wheel position request based on the retrieved steering profile.

8. The aircraft of claim 1, wherein the steering control unit is further operable to:
  retrieve a steering profile that relates a steering sensitivity to aircraft speed; and
  generate the wheel position request based on the retrieved steering profile.

9. A steering control system on an aircraft comprising:
  a steering request unit configured to receive a steering request;
  a speed measurement unit configured to determine a speed of the aircraft; and
  a steering control unit configured to:
  generate a wheel position request based on the received steering request and the determined speed of the aircraft; and
  transmit the wheel position request to a steering control device, the steering control device configured to turn a steerable wheel based on the generated wheel position request;
  wherein the steering control unit generates the wheel position request by limiting the wheel position request to a maximum angle based on the determined speed of the aircraft.

10. The steering control system of claim 9, wherein the speed is a ground speed representing a horizontal speed of the aircraft relative to the ground.

11. The steering control system of claim 9, wherein the steering control unit generates the wheel position request by limiting the wheel position request based on a steering sensitivity ratio; wherein the steering sensitivity ratio is a ratio between the steering request and the wheel position request, wherein the steering sensitivity ratio changes as a function of speed.

12. The steering control system of claim 9, wherein the steering control system further comprises an on-ground determination unit configured to determine whether the aircraft is on the ground.

13. The steering control system of claim 12, wherein the steering control unit is further operable to:
  generate the wheel position request based on the received steering request, whether the aircraft is on the ground, and the determined speed of the aircraft; and
  transmit the wheel position request to a steering control device, the steering control device operable to turn the steerable wheel based on the generated wheel position request.

14. The steering control system of claim 9, wherein the steering control unit is further operable to:
  retrieve a steering profile that relates a maximum angle to aircraft speed; and
  generate the wheel position request based on the retrieved steering profile.

15. The steering control system of claim 9, wherein the steering control unit is further operable to:
  retrieve a steering profile that relates the steering sensitivity to aircraft speed; and
  generate the wheel position request based on the retrieved steering profile.

* * * * *